A. H. CLEMENT.
INSECT DESTROYER.
APPLICATION FILED MAR. 6, 1917.
1,244,834.
Patented Oct. 30, 1917.
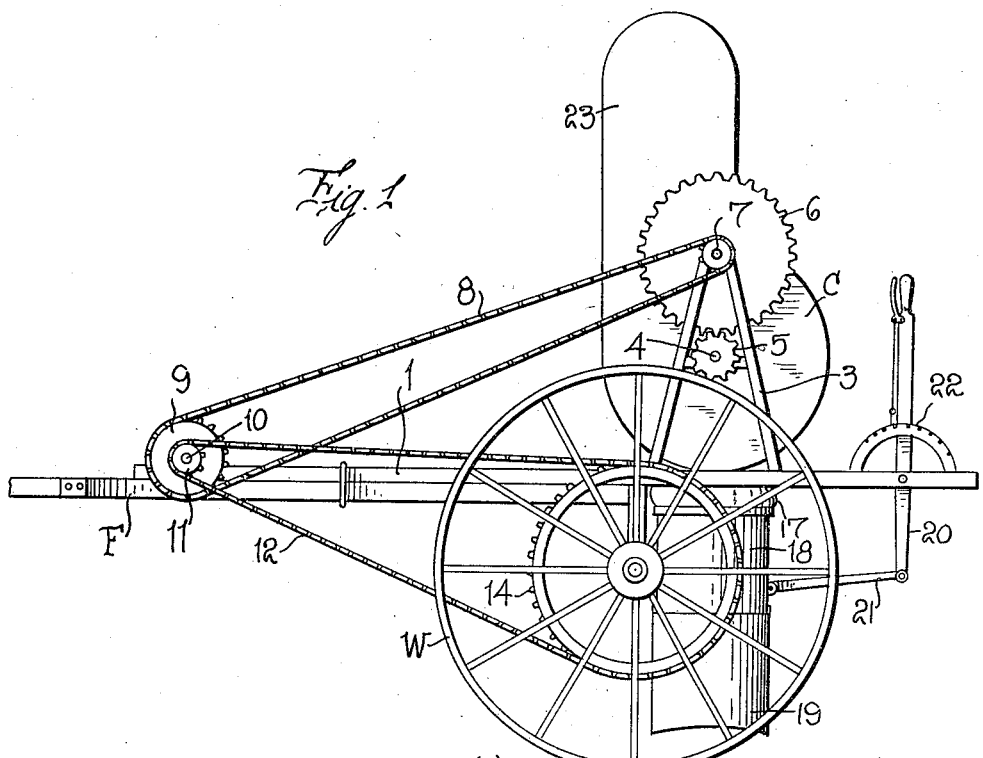
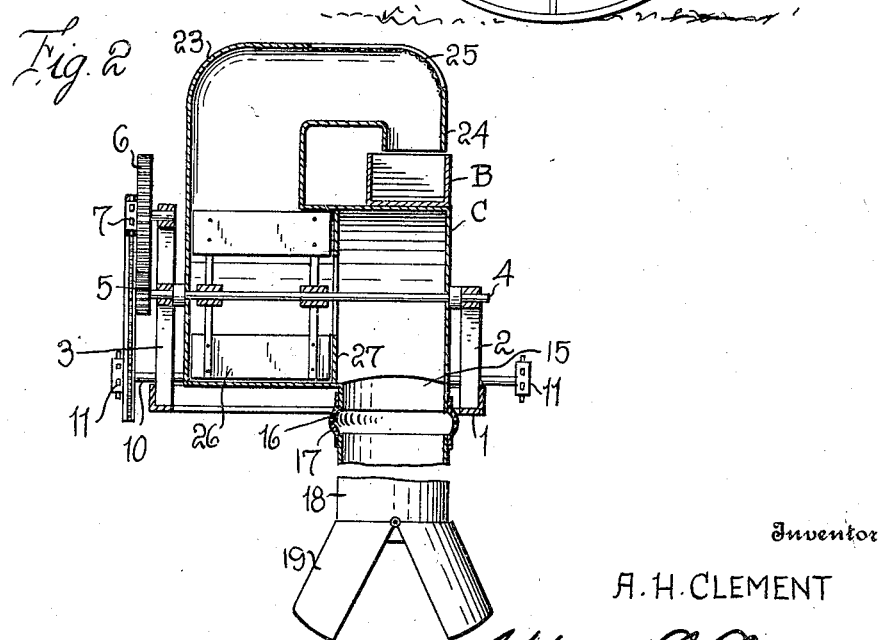
Inventor
A. H. CLEMENT
By Watson E. Coleman
Attorney

UNITED STATES PATENT OFFICE.

AUTHER H. CLEMENT, OF DECATUR, TEXAS.

INSECT-DESTROYER.

1,244,834.

Specification of Letters Patent.

Patented Oct. 30, 1917.

Application filed March 6, 1917. Serial No. 152,716.

*To all whom it may concern:*

Be it known that I, AUTHER H. CLEMENT, a citizen of the United States, residing at Decatur, in the county of Wise and State of Texas, have invented certain new and useful Improvements in Insect-Destroyers, of which the following is a specification, reference being had to the accompanying drawings.

This invention relates to insect destroyers and has relation more particularly to a device of this general character especially designed and adapted for use in connection with boll weevils or the like; and it is an object of the invention to provide an insect destroyer having novel and improved means whereby the insects may be readily gathered from plants.

It is also an object of the invention to provide a novel and improved device of this general character wherein pneumatic means is employed for collecting the insects to be destroyed.

The invention consists in the details of construction and in the combination and arrangement of the several parts of my improved insect destroyer whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view in side elevation of an insect destroyer constructed in accordance with an embodiment of my invention; and Fig. 2 is a fragmentary view in transverse section of the device as herein embodied.

As disclosed in the accompanying drawings, F denotes a conventional form of two-wheeled cultivator frame with which it is intended that my improved insect destroyer be operatively engaged. As herein set forth, my improved device includes a frame 1 substantially rectangular in form and adapted to be suitably clamped to the frame F. Adjacent its rear end and at opposite sides thereof the frame 1 is provided with the upstanding brackets 2 and 3, the bracket 3 being of a greater height than the bracket 2 for a purpose which will be hereinafter fully understood.

Positioned between the brackets 2 and 3 is a substantially cylindrical casing C having its opposite ends closed and through the axial center of which is disposed the shaft 4, said shaft being also rotatably supported by and extending beyond the brackets or bearings 2 and 3.

The end portion of the shaft 4 adjacent the bracket or bearing 3 is provided with the gear 5 in mesh with the larger gear 6 rotatably supported by the upper portion of the bracket or bearing 3. The larger gear 6 is provided with a sprocket 7 around which is directed the chain 8 which is also disposed around the larger sprocket 9 fixed to the shaft 10. The shaft 10 is positioned adjacent the forward end of the frame 1 and extends beyond opposite sides of said frame 1. The opposite end portions of the shaft 10 are provided with the sprockets 11 around which are directed the chains 12 which are also directed around the sprockets 14 operatively engaged with the supporting wheels W of the frame F.

Adjacent one end the under portion of the casing C is provided with an induction opening 15 defined by an annular flange 16. Operatively engaged with the flange 16 is a flexible conduit 17 formed preferably of leather. The outer end portion of the conduit 17 is engaged with the nozzle 18, the lower or suction end of which being provided with the hinged flaps or jaws 19 adapted to overlie the plants for a purpose which is believed to be clearly apparent to those skilled in the art to which my invention appertains.

The flexible conduit 17 permits adjustment of the nozzle 18 and as herein disclosed said nozzle 18 is adjusted through the medium of the lever 20 supported by a side of the frame 1 and operatively engaged with the nozzle through the medium of the link 21. The lever 20 and the adjacent portion of the frame 1 are provided with coacting locking means as indicated at 22.

In communication with the casing C through the top thereof and adjacent the end thereof remote from the induction opening 15 is a goose-neck discharge conduit or spout 23, extending longitudinally of the casing C, the depending portion 24 of which being adapted to discharge within the collecting box B, mounted upon the casing C at the end portion thereof provided with the nozzle 18. The box B has arranged therein a gasolene torch or the like for burning the insects discharged from the goose-neck. The upper portion of the goose-neck 23 adjacent the depending portion 24 is perforated, as at 25, so that the air created for sucking the insects from the plant will discharge therefrom. The perforations 25 are preferably produced through the medium of wire mesh so that the insects will not pass therethrough but will be caused to drop through the depending portion 24. It has also been found of advantage in practice to have the end portion of the goose neck 23 of a diameter greater than the diameter of the intermediate and depending portions thereof.

Affixed to the shaft 4 within the casing C is the suction fan 26, said fan 26 being positioned to one side of the induction opening 15 and in order to facilitate the action of the fan I find it of advantage to position intermediate the fan 26 and the induction opening 15 the annular partition 27 whereby a restricted opening is afforded at the central portion of the fan.

I wish to state at this time that I have found that my invention can also be employed with facility in the collecting of cotton and in which event the gasolene torch hereinbefore referred to is omitted.

From the foregoing description, it is thought to be obvious that an insect destroyer constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

A device of the character described comprising a portable frame, a casing carried by the frame and having its longitudinal axis substantially at right angles to the direction of travel of the frame, a nozzle depending from the casing adjacent one end thereof and in communication therewith and through the bottom of the casing, a goose neck discharge spout in communication with the casing through the top thereof and adjacent the end of the casing opposite to the nozzle, said spout being disposed longitudinally of the casing and discharging above the casing adjacent the end thereof provided with a spout, the end portion of the spout in communication with the casing being of a diameter greater than the intermediate or depending portion of the spout, a collecting box supported by the casing and into which the spout discharges, a suction fan mounted within the casing to one side of the nozzle, the upper portion of the spout at the discharge end thereof being perforate, and an annular partition arranged within the casing intermediate the fan and the point of communication between the nozzle and the casing.

In testimony whereof I hereunto affix my signature in the presence of two witnesses.

AUTHER H. CLEMENT.

Witnesses:
J. M. GIBBON, Jr.,
C. F. TODD.

Copies of this patent may be obtained for five cents each, by addressing the "Commissioner of Patents, Washington, D. C."